US012484818B2

(12) United States Patent
Jiang et al.

(10) Patent No.: US 12,484,818 B2
(45) Date of Patent: Dec. 2, 2025

(54) WEARABLE, CONTINUOUS BIOLOGICAL FLUID MONITORING SYSTEM

(71) Applicants: Hanqing Jiang, Chandler, AZ (US); Chao Liang, Tempe, AZ (US)

(72) Inventors: Hanqing Jiang, Chandler, AZ (US); Chao Liang, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 756 days.

(21) Appl. No.: 17/806,899

(22) Filed: Jun. 14, 2022

(65) Prior Publication Data

US 2022/0395203 A1 Dec. 15, 2022

Related U.S. Application Data

(60) Provisional application No. 63/210,412, filed on Jun. 14, 2021.

(51) Int. Cl.
*A61B 5/00* (2006.01)
*A61B 5/15* (2006.01)
*A61B 5/155* (2006.01)
*A61B 5/157* (2006.01)
*G01N 27/327* (2006.01)
*A61B 10/00* (2006.01)

(52) U.S. Cl.
CPC .. *A61B 5/150022* (2013.01); *A61B 5/150221* (2013.01); *A61B 5/150229* (2013.01); *A61B 5/150251* (2013.01); *A61B 5/150984* (2013.01); *A61B 5/155* (2013.01); *A61B 5/157* (2013.01); *G01N 27/3272* (2013.01); *A61B 2010/008* (2013.01)

(58) Field of Classification Search
CPC ........ A61B 5/150022; A61B 5/150221; A61B 5/150229; A61B 5/150251; A61B 5/150984; A61B 5/155; A61B 5/157; A61B 2010/008; A61B 5/1477; G01N 27/3272

See application file for complete search history.

(56) References Cited

U.S. PATENT DOCUMENTS

| | | | |
|---|---|---|---|
| 7,344,499 B1 * | 3/2008 | Prausnitz | A61B 5/150022 600/347 |
| 9,987,427 B1 * | 6/2018 | Polsky | A61B 5/150984 |
| 10,105,080 B1 * | 10/2018 | Kam | A61B 5/14514 |
| 10,729,386 B2 * | 8/2020 | Lipman | A61B 5/15113 |
| 11,517,232 B1 * | 12/2022 | Robertson | G08G 5/26 |
| 2009/0036795 A1 * | 2/2009 | Duineveld | A61B 5/150099 600/573 |

(Continued)

*Primary Examiner* — May A Abouelela
(74) *Attorney, Agent, or Firm* — Michael Best & Friedrich LLP

(57) ABSTRACT

Methods, systems, and apparatus, including biological fluid monitoring systems comprising a microneedle layer; at least one electromagnet assembly; and at least two liquid chambers coupled via a microfluidic layer, wherein the microneedle layer comprises a plurality of microneedles configured to extract interstitial fluid (ISF) from a patient in to one of the at least two liquid chambers, and wherein the at least one electromagnet assembly is configured to a move a test sample of the extracted ISF through the at least two liquid chambers to conduct a test cycle.

18 Claims, 11 Drawing Sheets

(56) References Cited

U.S. PATENT DOCUMENTS

| | | | | |
|---|---|---|---|---|
| 2010/0210932 | A1* | 8/2010 | Rebec | A61B 5/150412 |
| | | | | 600/347 |
| 2011/0224515 | A1* | 9/2011 | Mir | A61B 5/15151 |
| | | | | 600/317 |
| 2012/0277697 | A1* | 11/2012 | Haghgooie | A61B 5/14514 |
| | | | | 604/327 |
| 2013/0158468 | A1* | 6/2013 | Bernstein | A61B 5/150969 |
| | | | | 604/173 |
| 2014/0336487 | A1* | 11/2014 | Wang | A61B 5/6833 |
| | | | | 600/352 |
| 2015/0233861 | A1* | 8/2015 | Cai | G01N 27/3272 |
| | | | | 204/403.02 |
| 2016/0029937 | A1* | 2/2016 | Sia | A61B 5/1459 |
| | | | | 600/479 |
| 2017/0095190 | A1* | 4/2017 | Sloan | B01L 3/502753 |
| 2018/0103884 | A1* | 4/2018 | Delamarche | A61B 5/150221 |
| 2018/0242890 | A1* | 8/2018 | Chickering, III | |
| | | | | A61B 5/150984 |
| 2018/0256086 | A1* | 9/2018 | Polsky | A61B 5/150068 |
| 2018/0256208 | A1* | 9/2018 | Altschul | A61B 5/14532 |
| 2018/0338713 | A1* | 11/2018 | Polsky | A61B 5/157 |
| 2019/0008448 | A1* | 1/2019 | Begtrup | G01N 33/48792 |
| 2019/0175081 | A1* | 6/2019 | Garcia Perez | A61B 5/14514 |
| 2019/0231234 | A1* | 8/2019 | Kojima | A61B 5/14517 |
| 2020/0155048 | A1* | 5/2020 | Bertand | A61B 5/6833 |
| 2020/0163656 | A1* | 5/2020 | Velev | A61B 5/150061 |
| 2020/0315502 | A1* | 10/2020 | Samant | A61B 10/0045 |
| 2021/0060322 | A1* | 3/2021 | Burton | A61B 5/4839 |
| 2021/0137435 | A1* | 5/2021 | Queval | A61B 5/150099 |
| 2021/0228124 | A1* | 7/2021 | Gonzalez-Zugasti | |
| | | | | A61B 5/150022 |
| 2021/0298679 | A1* | 9/2021 | Pierart | A61B 5/14532 |
| 2021/0353267 | A1* | 11/2021 | Qin | A61B 5/150022 |
| 2022/0031211 | A1* | 2/2022 | Yakhnich | A61B 5/150114 |
| 2022/0151593 | A1* | 5/2022 | Garcia Perez | A61B 5/14546 |
| 2023/0077165 | A1* | 3/2023 | Roxhed | A61B 5/14514 |
| 2024/0081724 | A1* | 3/2024 | Strohmaier | A61B 5/150984 |

* cited by examiner

WEARABLE, CONTINUOUS BIOLOGICAL FLUID MONITORING SYSTEM

BACKGROUND

Nutrients and metabolites circulate throughout the human body and provide useful indicators of biological processes in the human body. Concentrations of nutrients and metabolites in biological fluids (biofluids) have been used for clinical risk assessment, diagnosis, prognosis and monitoring of therapeutic outcomes.

SUMMARY

Abnormal concentrations of circulating metabolites and nutrients are associated with health conditions such as metabolic syndrome and cardiovascular disease. Wearable devices have the potential to capture changes in patient health both rapidly and continuously. For example, continuous blood glucose monitoring, which avoids missing information about important blood glucose changes, holds great significance for the diagnosis and treatment of diabetes.

Current monitoring solutions that elaborate on, for example, continuous blood glucose monitoring enable minimally invasive continuous blood glucose monitoring using implantable enzymatic sensors. However, biomacromolecule binding that causes foreign body reaction is hardly prevented. Additionally, long-term implanted sensors can cause biocompatible issues. These inherent drawbacks make clinical promotion of such implantable products difficult.

Moreover, non-invasive analysis, such as sweat analysis, can provide a good alternative for these issues. However, continuous sweat acquisition may require additional incentives such as sports or medicine activation. Additionally, sweat glucose is not closely related to that of glucose in blood. Thus, blood glucose prediction based on sweat glucose monitoring is not reliable enough to be applied in clinical settings. One solution for these problems includes continuously extracting, moving, and testing interstitial fluid (ISF) out of the human body. Such a solution may include, for example, a wearable, biocompatible component.

Accordingly, implementations of the present disclosure are generally directed to a wearable, continuous biofluid monitoring system. In some embodiments, a microneedle and a negative pressure device are used to extract the ISF from a patient or user.

In one aspect, disclosed herein, are biological fluid monitoring systems comprising: a microneedle layer; at least one electromagnet assembly; and at least two liquid chambers coupled via a microfluidic layer. In some embodiments, the microneedle layer comprises a plurality of microneedles configured to extract ISF from a patient in to one of the at least two liquid chambers. In some embodiments, the at least one electromagnet assembly is configured to a move a test sample of the extracted ISF through the at least two liquid chambers to conduct a test cycle. In some embodiments, the at least two chambers comprise a sample collection chamber. In some embodiments, the microneedles are configured to extract ISF into the sample collection chamber. In some embodiments the at least two chambers comprise a metering chamber. In some embodiments, the test cycle comprises: collecting a test sample of the extracted ISF by moving a portion of the ISF from the sample collection chamber to the metering chamber; and determining a volume of the test sample. In some embodiments, one of the at least two chambers comprise a test chamber. In some embodiments, the test cycle comprises: moving the test sample from the metering chamber to the test chamber; and conducting an electrochemical reaction on the test sample. In some embodiments, the at least two chambers comprise a waste chamber. In some embodiments, the test cycle comprises: moving the test sample to the waste chamber to complete the test cycle. In some embodiments, the test cycle to provide is repeat to provide continuous monitoring of the patient. In some embodiments, each of the at least one electromagnet assembly comprises an iron core, a wire, and a permanent magnet. In some embodiments, the iron core and the wire form an electromagnet having an opposite polarity to the permanent magnet. In some embodiments, the electromagnet is configured to detach, when charged, from the permanent magnet to allow air into a formed pump source chamber. In some embodiments, each of the at least one electromagnet assembly is coupled to a respective one of the at least two liquid chambers and a valve formed by a valve block. In some embodiments, the electromagnet is configured to generate, when charged, a negative pressure in the respective liquid chamber and open the valve. In some embodiments, the permanent magnet attracts the electromagnet. In some embodiments, the electromagnet is configured to close, when uncharged, the formed pump source chamber forcing the stored air into the respective liquid chamber and closing the valve. In some embodiments, the respective liquid chamber is configured to drive stored liquid into an adjacent one of the at least two liquid chambers via the microfluidic layer as the stored air is received. In some embodiments, the respective liquid chamber is configured to drive excess liquid into one of the at least two liquid chambers via the microfluidic layer. In some embodiments, the biological fluid monitoring system comprises a pneumatic layer and a membrane. In some embodiments, the membrane is positioned between the pneumatic layer and the microneedle layer. In some embodiments, the at least two liquid chambers are formed between the pneumatic layer and the microneedle layer. In some embodiments, the biological fluid monitoring systems are configured to be worn by the patient. In some embodiments, a surface of the microneedle layer is configured to be attached to the patient.

In another aspect, disclosed herein, are methods for providing a test cycle to ISF collected from a patient. These the methods comprise: extracting, via a microneedle layer, the ISF into a sample collection chamber formed on a biological fluid monitoring system comprising the microneedle layer a pneumatic layer, and a membrane, wherein the membrane is positioned between the pneumatic layer and the microneedle layer; collecting a test sample of the extracted ISF by moving a portion of the ISF from the sample collection chamber to a metering chamber form on the biological fluid monitoring system; determining a volume of the test sample; moving the test sample from the metering chamber to a test chamber formed on the biological fluid monitoring system; conducting an electrochemical reaction on the test sample; and moving the test sample to a waste chamber formed on the biological fluid monitoring system to complete the test cycle. In some embodiments, each of the formed chambers is coupled to one another via a microfluidic layer. In some embodiments, the biological fluid monitoring system comprises a plurality of electromagnet assemblies each coupled to one of the formed chambers and configured to move the test sample between the coupled to formed chamber and the adjacent formed chamber. In some embodiments, the test cycle is repeated to provide continuous monitoring of the patient. In some embodiments, the microneedle layer comprises a plurality of microneedles configured to extract the ISF from the patient.

In some embodiments, each of the electromagnet assemblies comprise an iron core, a wire, and a permanent magnet. In some embodiments, the iron core and the wire form an electromagnet having an opposite polarity to the permanent magnet. In some embodiments, the electromagnet is configured to detach, when charged, from the permanent magnet to allow air into a formed pump source chamber. In some embodiments, each of the electromagnet assemblies is coupled to a respective one of the formed chambers and a valve formed by a valve block. In some embodiments, the electromagnet is configured to generate, when charged, a negative pressure in the respective formed chamber and open the valve. In some embodiments, the permanent magnet attracts the electromagnet. In some embodiments, the electromagnet is configured to provide close, when uncharged, the formed pump source chamber forcing the stored air into the respective formed chamber and closing the valve. In some embodiments, the respective formed chamber is configured to drive stored liquid into an adjacent formed chambers via the microfluidic layer as the stored air is received. In some embodiments, the respective formed chamber is configured to drive excess liquid into one of the waste chambers via the microfluidic layer. In some embodiments, the biological fluid monitoring system is configured to be worn by the patient. In some embodiments, a surface of the microneedle layer is configured to be attached to the patient.

In another aspect, disclosed herein, are biological fluid monitoring systems configured to be worn by a patient and comprising: a microneedle layer comprising a plurality of microneedles; a pneumatic layer; a membrane, wherein the membrane is positioned between the pneumatic layer and the microneedle layer; a sample collection chamber, a metering chamber, a test chamber, and waste chamber each formed between the pneumatic layer and the microneedle layer and coupled to each other via a microfluidic layer, wherein the microneedles are configured to extract ISF from the patient into the sample collection chamber; and at least one electromagnet assembly coupled to a respective one of the formed chambers and a valve formed by a valve block, the at least one electromagnet assembly comprising an iron core, a wire, and a permanent magnet, wherein the iron core and the wire form an electromagnet having an opposite polarity to the permanent magnet, wherein the electromagnet is configured to, when charged: detach from the permanent magnet to allow air into a formed pump source chamber, and generate a negative pressure in the respective coupled to formed chamber to open the valve, wherein the electromagnet is configured to, when charged: close the formed pump source chamber forcing the stored air into the respective coupled to formed chamber to close the valve, and wherein the respective coupled to formed chamber is configured to drive stored liquid into an adjacent one of the formed chambers via the microfluidic layer as the stored air is received.

Particular implementations of the subject matter described in this disclosure can be implemented so as to realize one or more of the following advantages. In some embodiments, the described system minimizes biocompatible issues because the microneedles are inserted into only the epidermis of the human skin. In some embodiments, electromagnetic-pneumatic pump/valve technology (EPPT), which can be employed to move the extracted IFS through the various chambers of the disclosed biological fluid monitoring systems, is applied for a fully integrated, wearable and out-of-body manipulation for the biofluid.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Before any embodiments of the disclosure are explained in detail, it is to be understood that the disclosure is not limited in its application to the details of embodiment and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect.

Embodiments of the present disclosure are generally directed to a biological fluid monitoring system. More particularly, embodiments of the present disclosure are directed to providing, via a biological fluid monitoring system, a test cycle to ISF collected from a patient.

Figure 1:
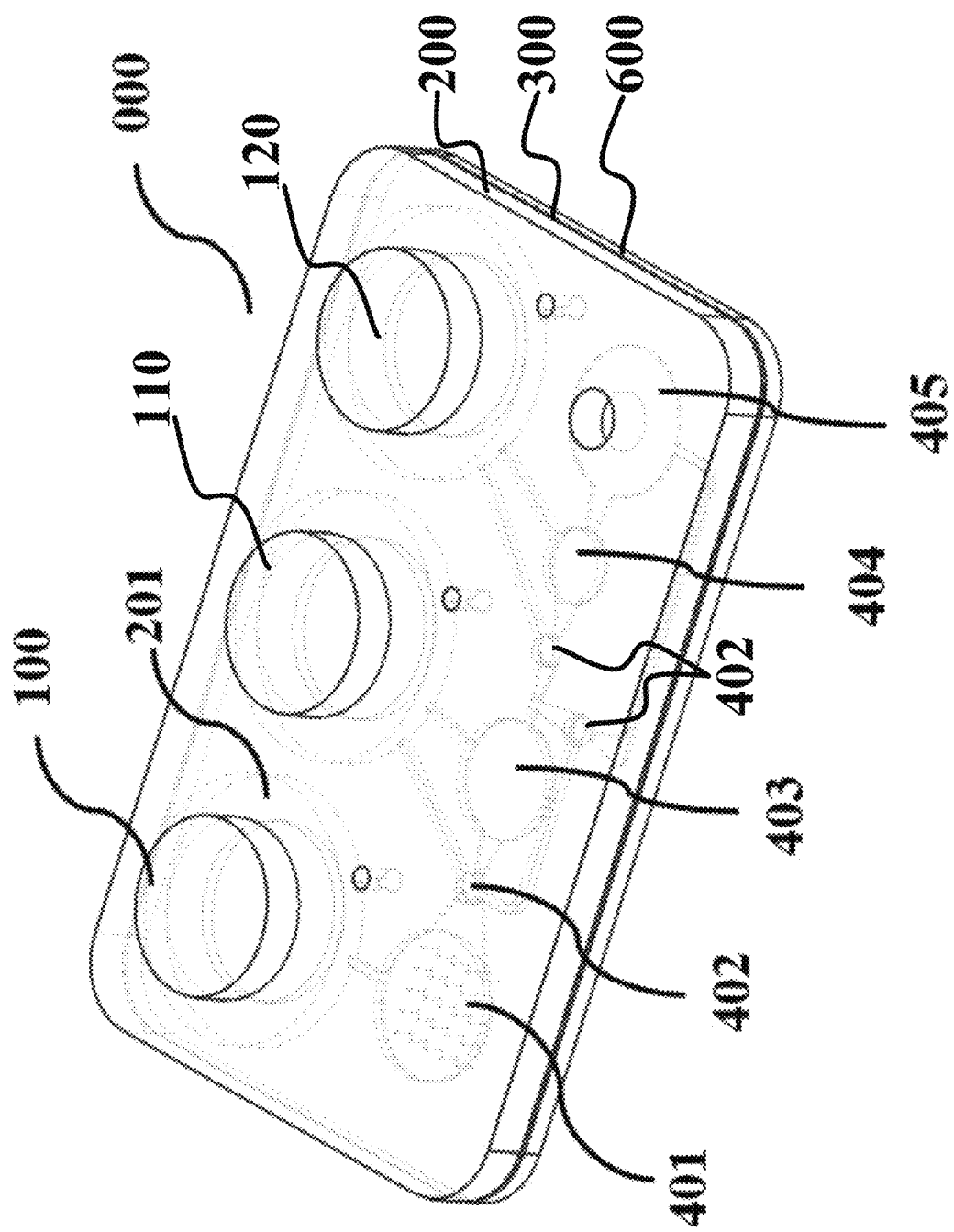
FIG. 1 depicts an exemplary embodiment of a wearable, continuous biofluid monitoring system.

FIG. 1 depicts an exemplary embodiment of a wearable, continuous biofluid monitoring system 000 according to implementations of the present disclosure. The depicted biofluid monitoring system 000 generally comprises a pneumatic layer 200 and a microneedle layer 600 with a membrane 300 positioned between these two layers. In some embodiments, the microneedle layer 600 includes a number of microneedles that can be used to extract the ISF from the epidermal layer of the skin. As depicted, the continuous biofluid monitoring system 000 includes various structures formed within and/or connected to the pneumatic layer 200, the microneedle layer 600, and the membrane 300, which are connected through a microfluidic layer (not shown). These structures may include electromagnet assemblies 100, 110, and 120; a pump source chamber 201; a sample collection chamber 401; valve blocks 402; a metering chamber 403; a test chamber 404; and a waste chamber 405, which are depicted in FIG. 1. In some embodiments, the pneumatic layer 200 and the membrane 300 comprise a silicone or polysiloxane material, such as Polydimethylsiloxane (PDMS). In some embodiments, the microneedle layer 600 comprises Poly (methyl methacrylate) (PMMA).

In some embodiments, the ISF is collected into the sample collection chamber 401. In some embodiments, the ISF is moved from the sample collection chamber 401 to the metering chamber 403, which is used to determine the volume of the test sample. In some embodiments, a sample is moved to the test chamber 404 to conduct, for example, an electrochemical reaction. In some embodiments, an electrochemical detection assembly 450 (see FIG. 4) is employed to conduct the electrochemical reaction. In some embodiments, the electrochemical detection assembly 450 is inserted into the continuous biofluid monitoring system 000 so as to come into contact with the sample in test chamber 404. In some embodiments, the sample is pumped into the waste chamber 405, which completes a test cycle. In some embodiments, such a test cycle can be repeated to provide continuous monitoring. For example, a test cycle may be repeated about every 30 seconds, about every minute, about every 2 minutes, about every 3 minutes, about every 4 minutes, about every 5 minutes, about every 6 minutes, about every 7 minutes, about every 8 minutes, about every 9 minutes, about every 10 minutes, about every 12 minutes, about every 15 minutes, about every 20 minutes, about every 30 minutes, about every 45 minutes, about every hour, about every 2 hours, about every 3 hours, about every 4 hours, about every 5 hours, about every 6 hours, about every 7 hours, about every 8 hours, about every 9 hours, about every 10 hours, about every 16 hours, about every 24 hours, about every 48 hours, or about every 72 hours.

FIGS. 2A-2D depict various views of the wearable, continuous biofluid monitoring system 000 to highlight the pump/valve assembly of the system. As depicted, the electromagnet assembly 100 includes an iron core 101, a magnet wire 102, sealing adhesive 103, the pump source chamber 201, and a permanent magnet 500. In some embodiments, the sealing adhesive 103 prevents liquid from leaking between pneumatic layer 200 and the liquid layer various chambers that hold liquid (e.g., the liquid drive chamber 202). The electromagnet assembly 100 is shown in cross-section B-B in FIG. 2B. In some embodiments, electromagnet assemblies 110 and 120, depicted in FIG. 1, include the same or similar features.

As depicted, the sample collection chamber 401 includes a liquid drive chamber 202 formed within the microfluidic layer 400. The sample collection chamber 401 is shown in cross section C-C in FIG. 2C. In some embodiments, the metering chamber 403, the test chamber 404, and the waste chamber 405, depicted in FIG. 1, include the same or similar features.

Figure 2A:
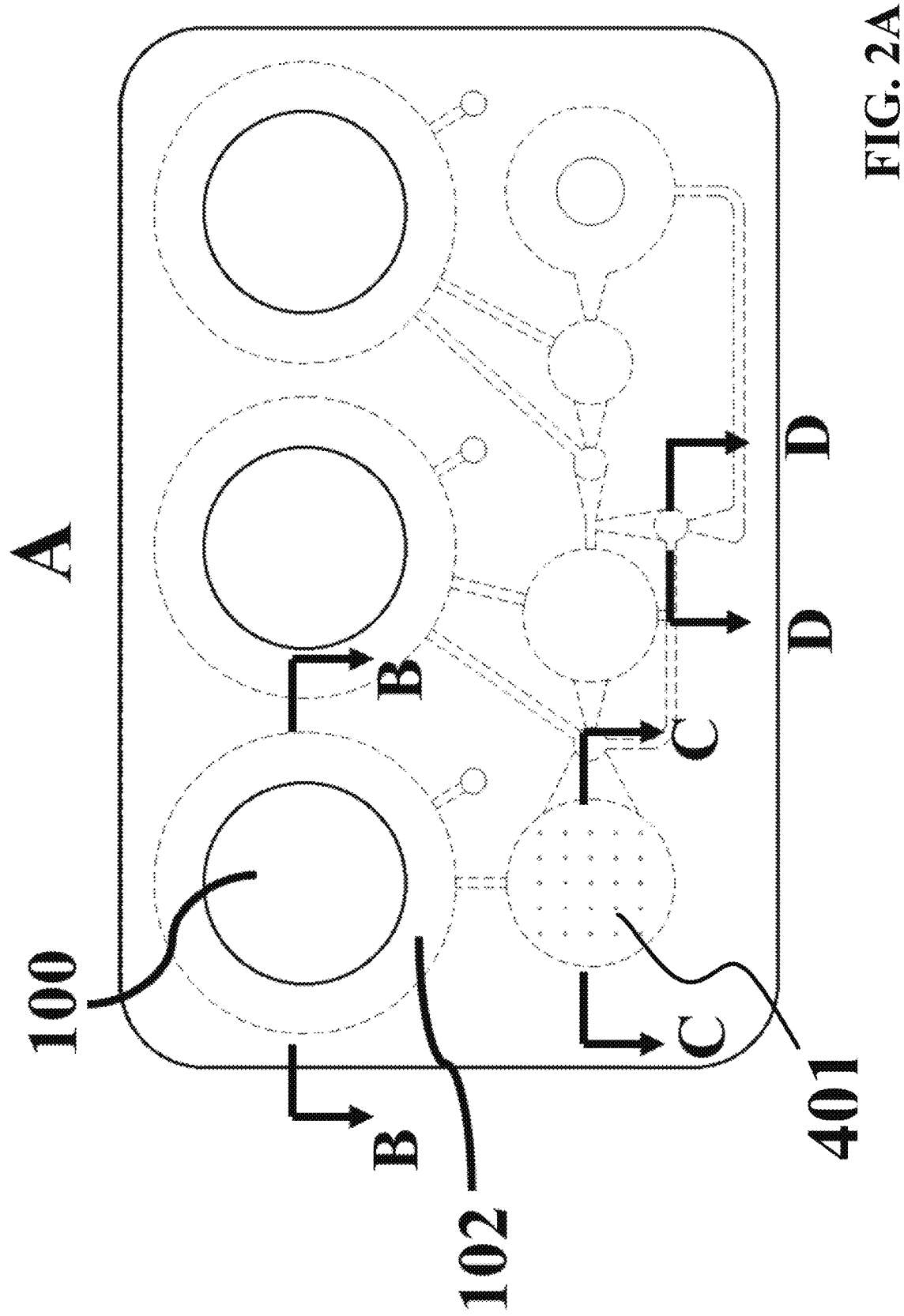
FIGS. 2A-2D depict various views of the wearable, continuous biofluid monitoring system illustrated in FIG. 1 to highlight a pump/valve assembly of the system.
Figure 2B:
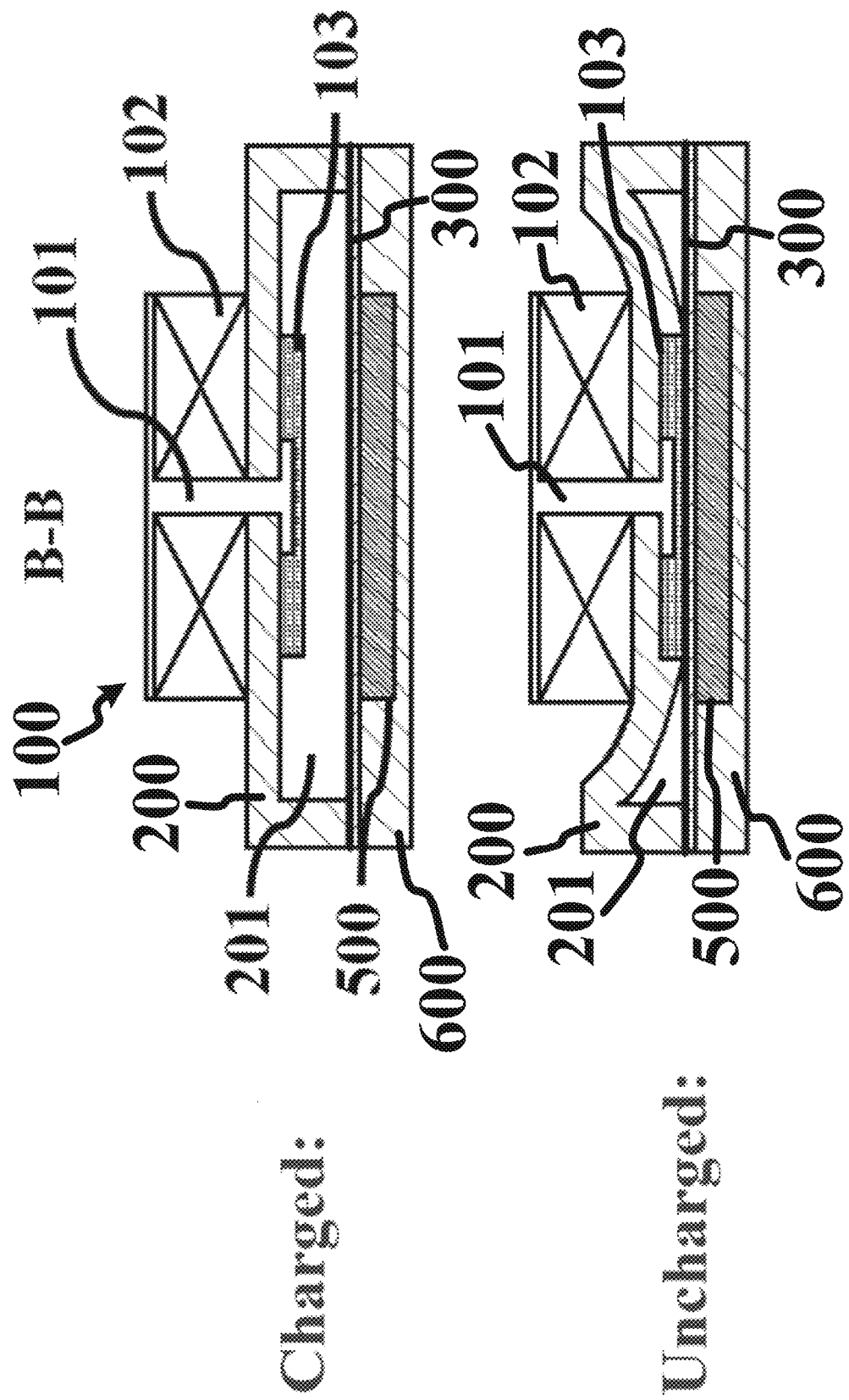
Figure 2C:
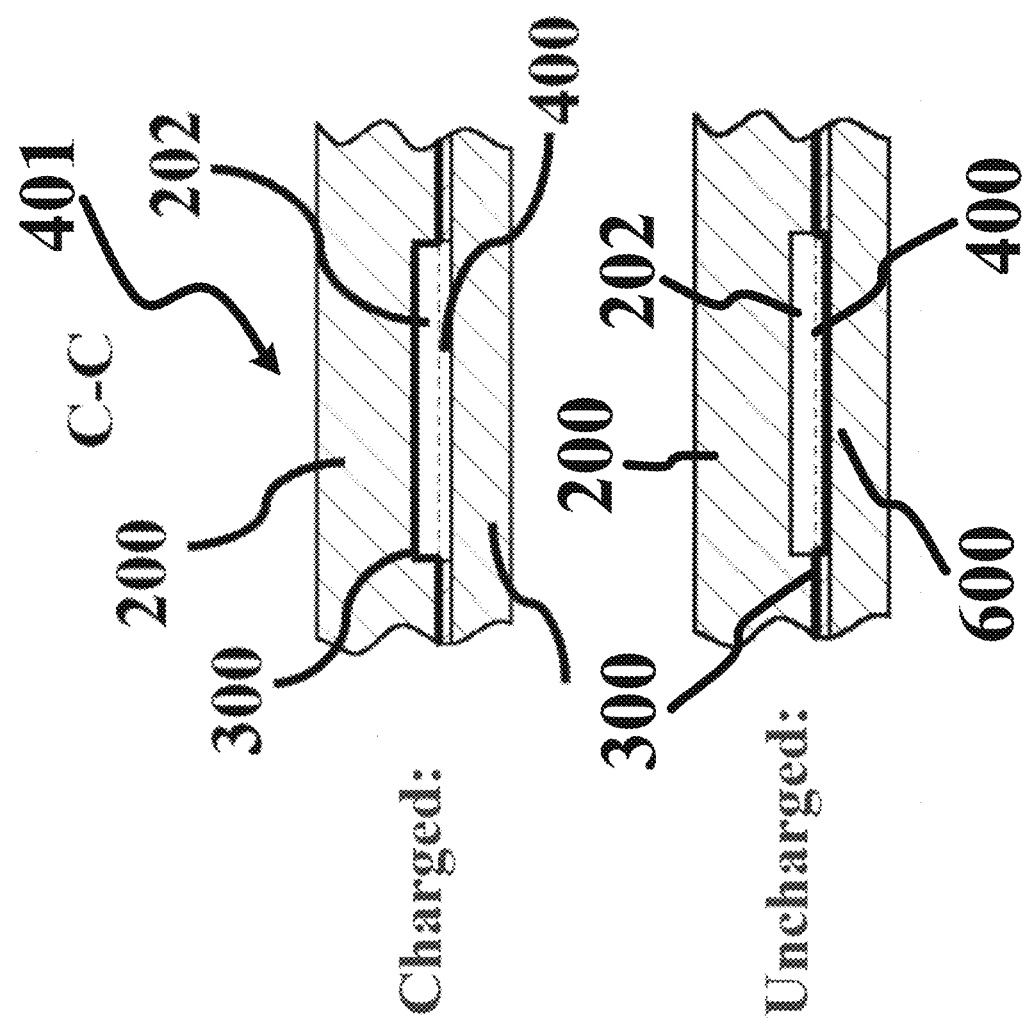
Figure 2D:
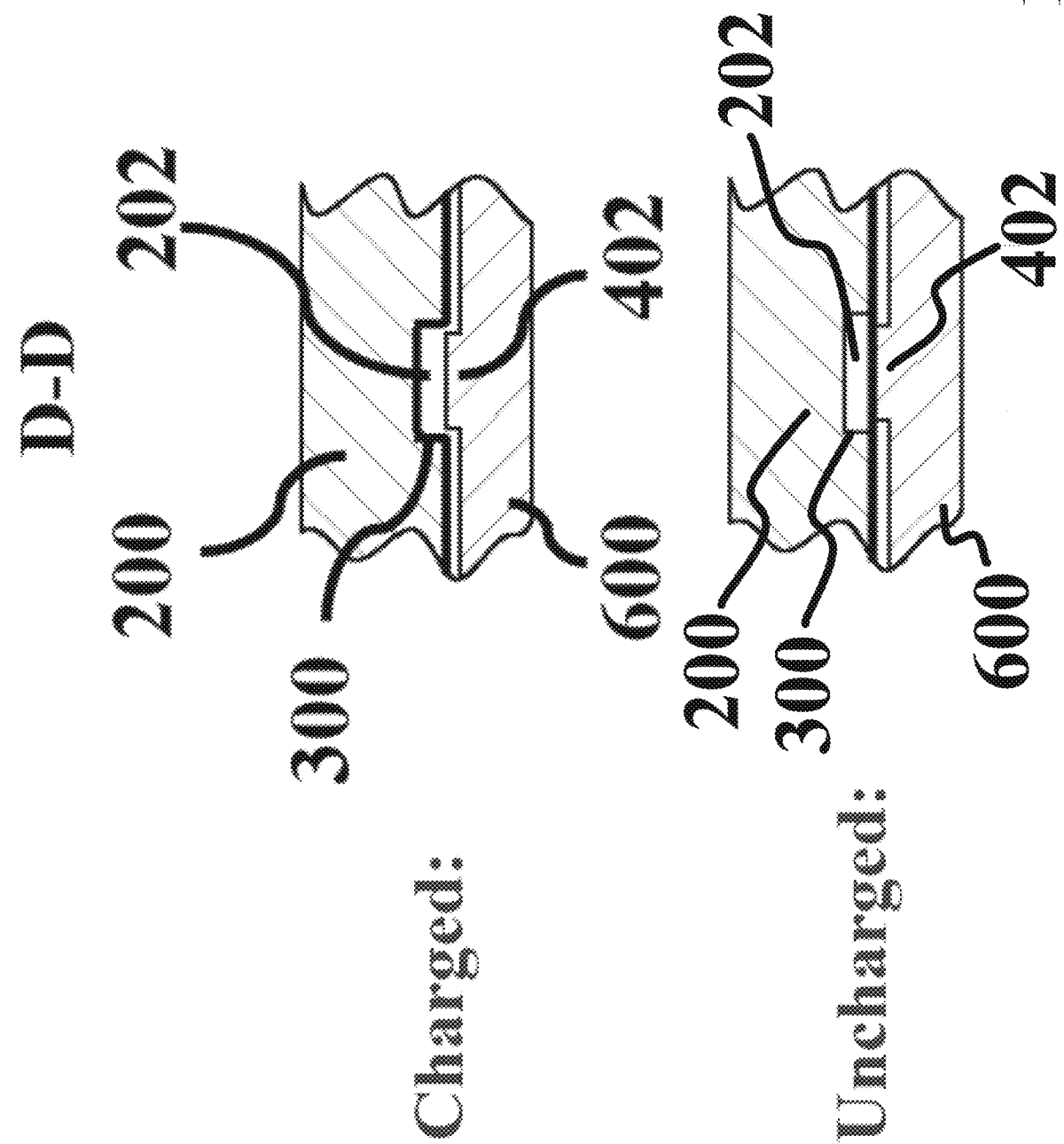

One of the valve blocks 402 is shown in cross section D-D in FIG. 2D. In some embodiments, the other valve blocks 402 depicted in FIG. 1, include similar features.

In some embodiments, an electromagnet formed from the iron core 101 and the magnet wire 102, is designed to have opposite polarity to the permanent magnet 500. In some embodiments, when the electromagnet is charged, the electromagnet can be detached from the permanent magnet and air flows into the pump source chamber 201. In this way, a negative pressure is generated in the liquid drive chamber 202 and the valve formed by the valve block 402 is open. In some embodiments, when the electromagnet is uncharged, the electromagnet is attracted by the permanent magnet and the air stored in the pump source chamber 201 flows into the liquid drive chamber 202, driving the liquid forward. At this time, the membrane 300 covers the valve block 402 and the valve is closed.

Figure 3A:
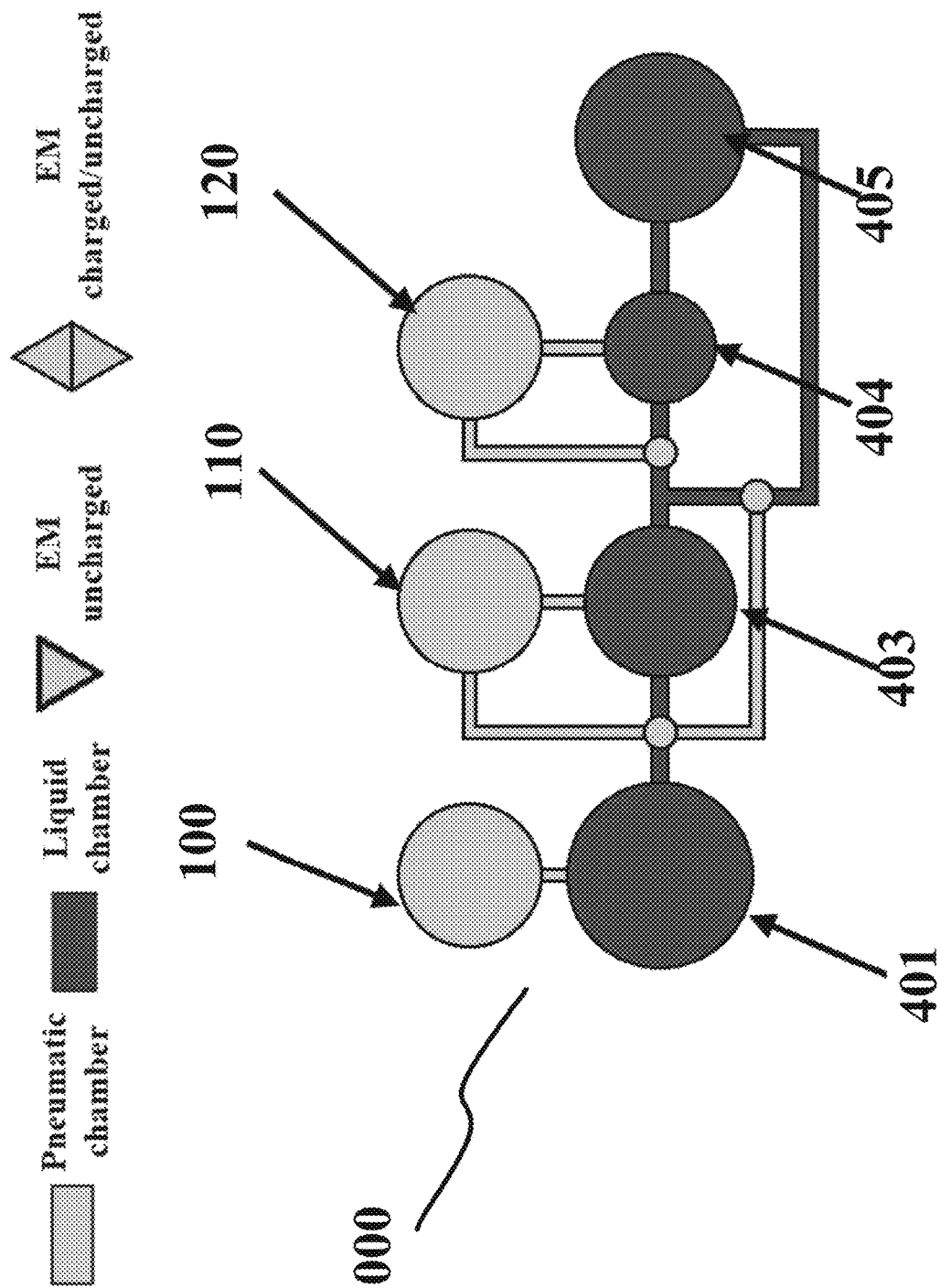
FIGS. 3A-3D depicts an example test process performed with the example biofluid monitoring system.
Figure 3B:
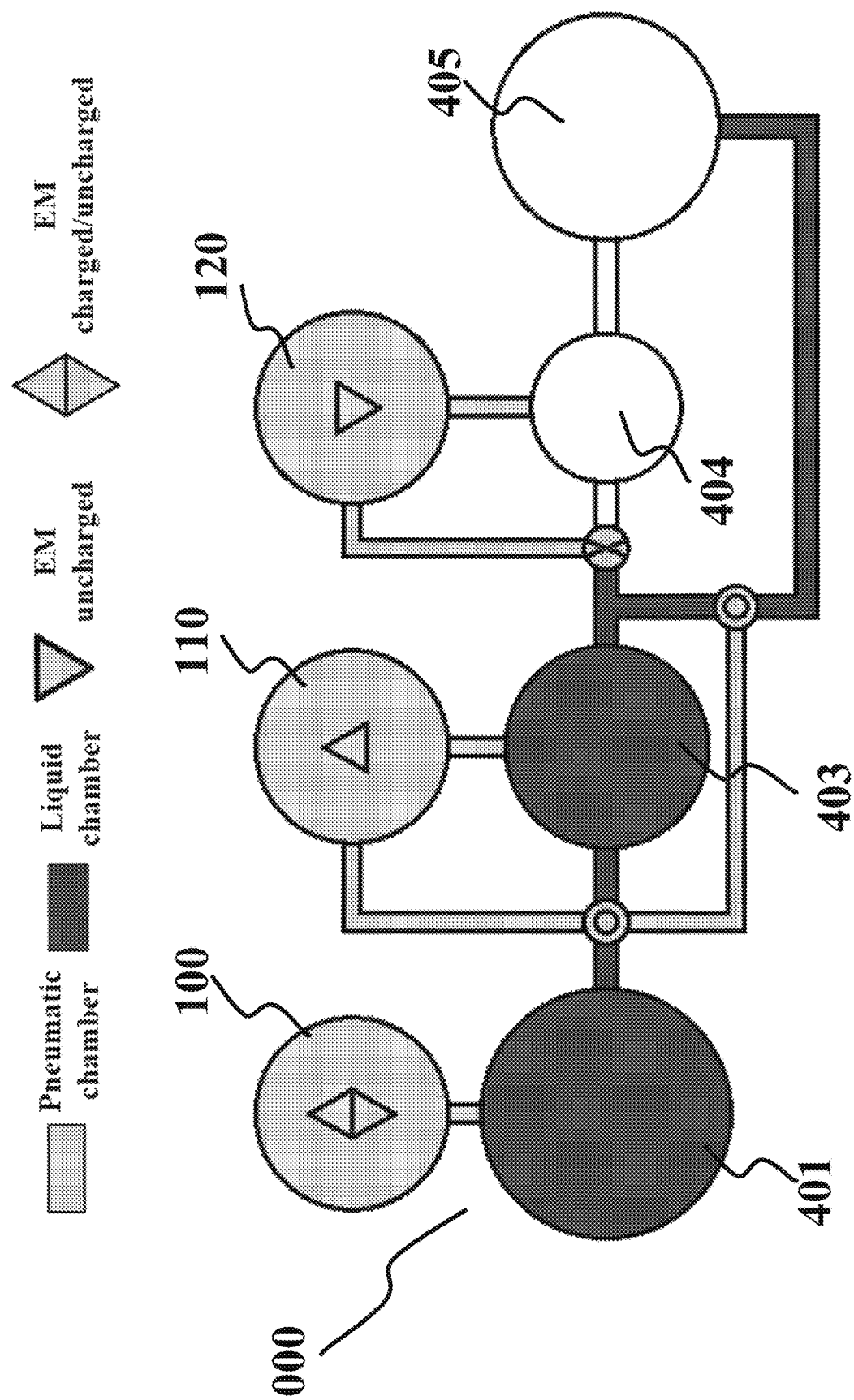
Figure 3C:
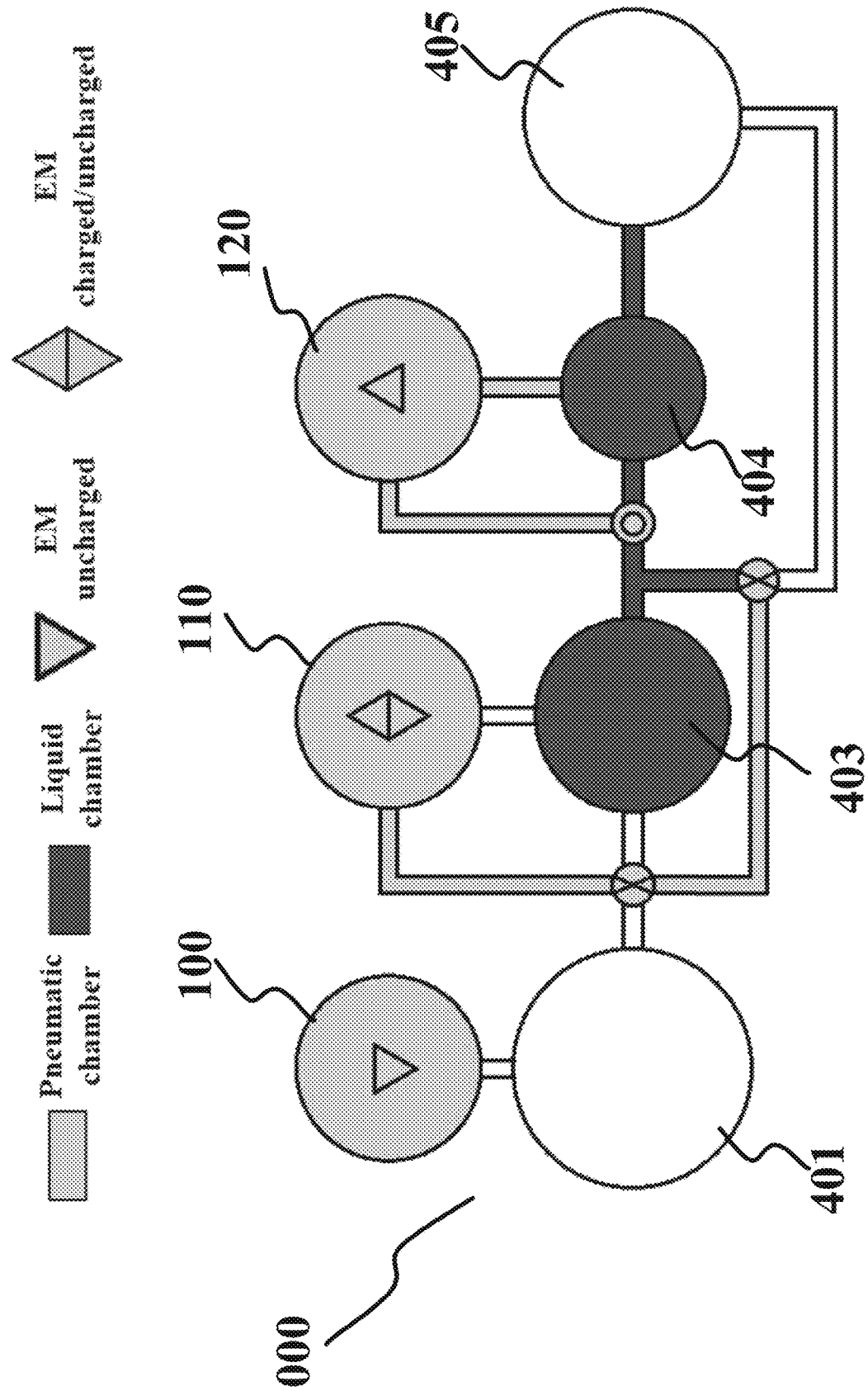
Figure 3D:
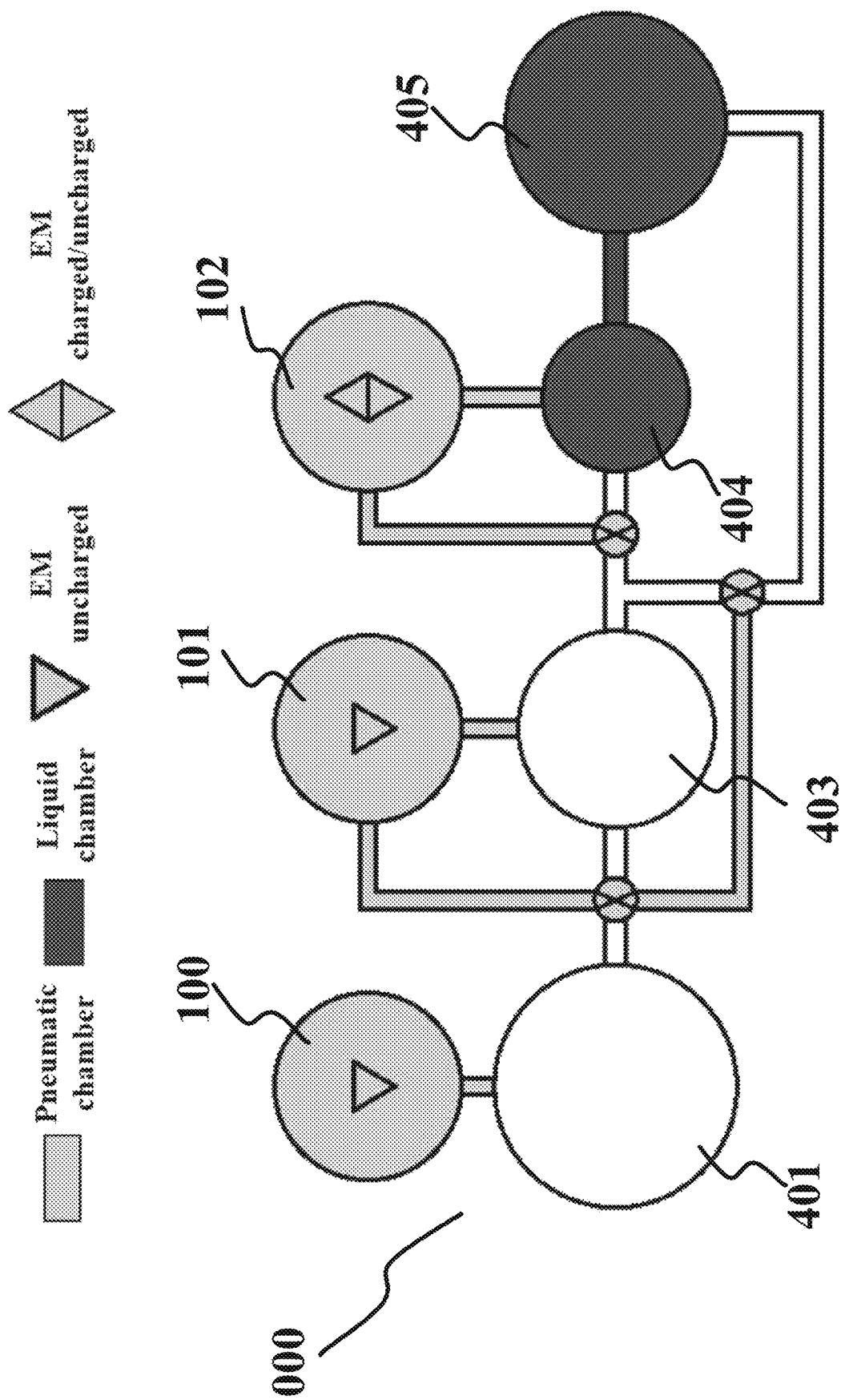

FIGS. 3A-3D depict an example test process performed with the example biofluid monitoring system 000. FIG. 3B depicts charging/uncharging the electromagnet assembly 100 to extracting biofluid into the sample collection chamber 401 and move the biofluid to the metering chamber 403 and excessive biofluid to waste chamber 405. FIG. 3C depicts charging/uncharging the electromagnet assembly 110 to move the biofluid to the test chamber 404 and excessive biofluid to the waste chamber 405. FIG. 3D depicts charging/uncharging the electromagnet assembly 120 to move the biofluid to the waste chamber 405. In some embodiments, filter paper is embedded in the waste chamber 405, which absorb the excessive biofluid and can be replaced, for example, with each subsequent test cycle.

Figure 4:
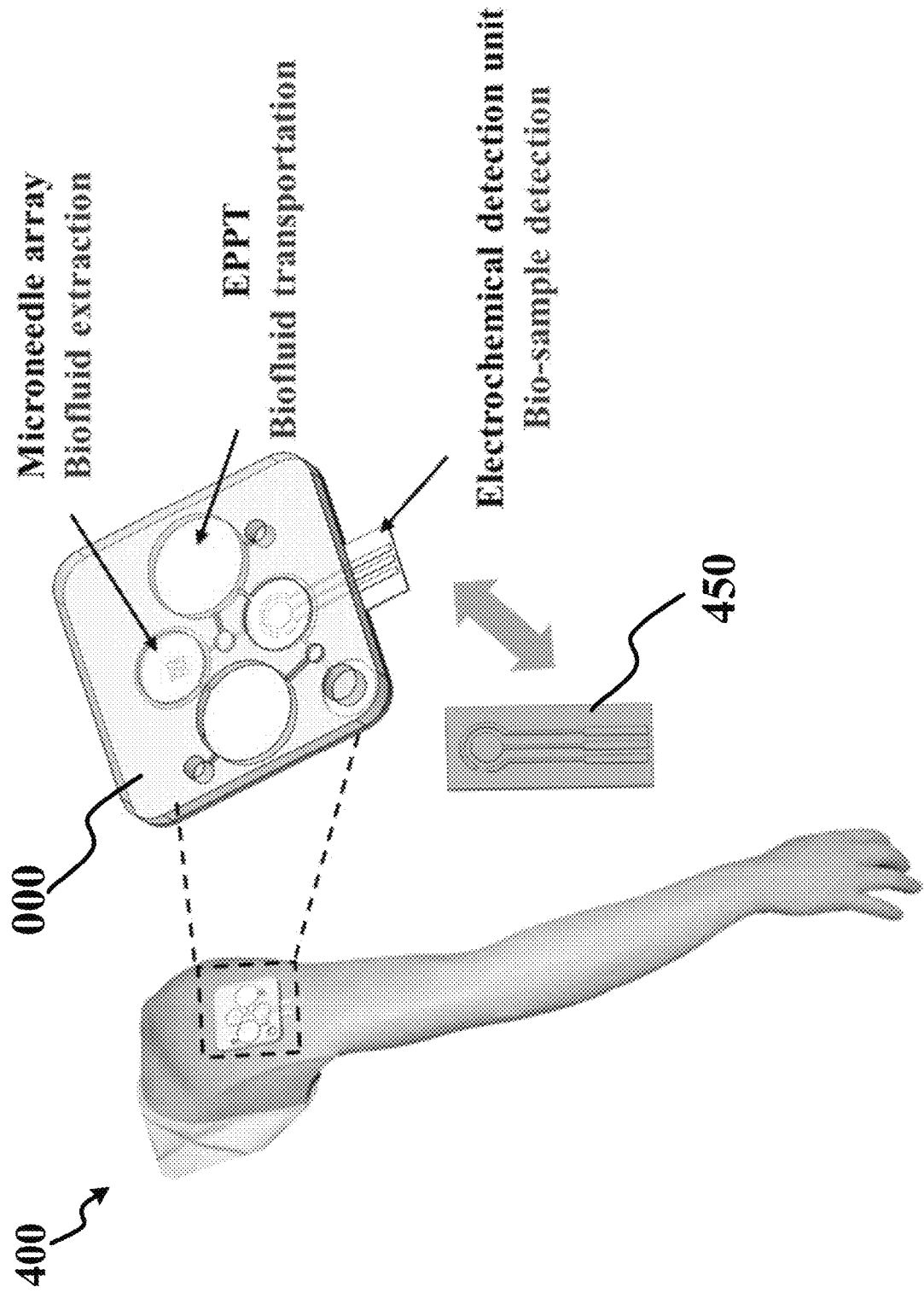
FIG. 4 depicts an example environment where the described wearable, continuous biofluid monitoring system illustrated in FIG. 1 can be employed to collect and test a sample of ISF.

FIG. 4 depicts an example environment 400 where the described wearable, continuous biofluid monitoring system 000 can be employed to collect and test a sample of ISF. As depicted, the wearable, continuous biofluid monitoring system 000 is secured or otherwise attached to a subject's skin where the ISF is extracted from the epidermal layer. The wearable, continuous biofluid monitoring system 000 then employs the various electromagnet assemblies to collect a test sample and move the sample through the device. In some embodiments, the electrochemical detection assembly 450 is inserted in the continuous biofluid monitoring system 000 to come into contact with the collected sample. In some embodiments, the electrochemical detection assembly 450 is employed to detect electric currents generated from oxidative or reductive reactions in test sample.

Figure 5:
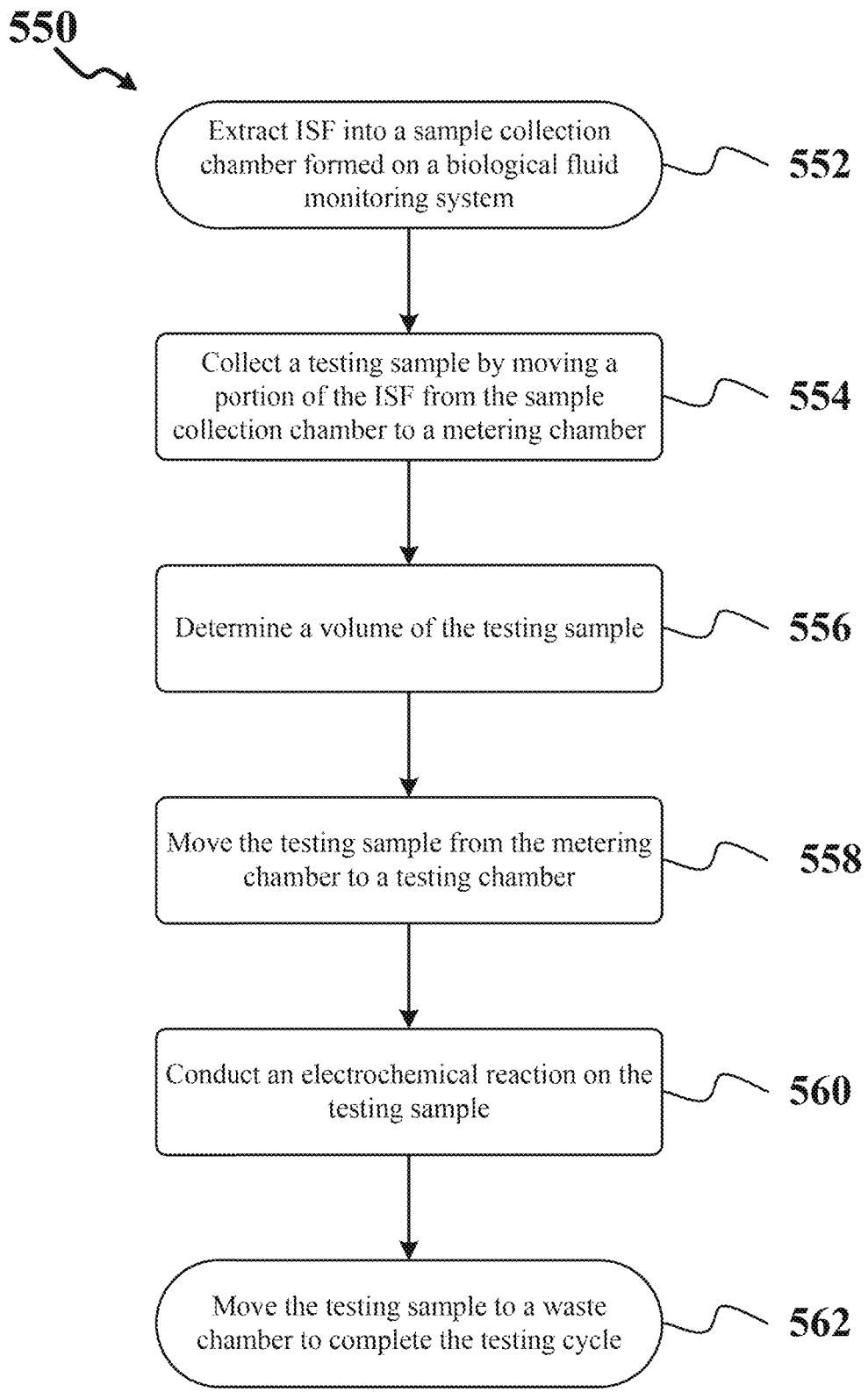
FIG. 5 depicts a flow diagram of an example process for providing a test cycle on ISF collected from a patient via the biological fluid monitoring system illustrated in FIG. 1.

FIG. 5 depicts a flow diagram of an example process 550 for providing a test cycle to ISF collected from a patient via a biological fluid monitoring system. For clarity of presentation, the description that follows generally describes the process 550 in the context of FIGS. 1, 2A, 2B, and 3A-3D. However, it will be understood that the process 550 may be performed, for example, by any other suitable system or a combination of systems as appropriate. In some embodiments, the test cycle is repeated to provide continuous monitoring of the patient.

At 552, the ISF is extracted via a microneedle layer into a sample collection chamber formed on the biological fluid monitoring system. In some embodiments, the ISF is extracted from the epidermal layer of the human body. In some embodiments, the biological fluid monitoring system comprises the microneedle layer, a pneumatic layer, and a membrane. In some embodiments, the membrane is positioned between the pneumatic layer and the microneedle layer. In some embodiments, the microneedle layer comprises a plurality of microneedles configured to extract the ISF from the patient. In some embodiments, a surface of the microneedle layer is configured to be attached to the patient. From 552, the process 550 proceeds to 554.

At 554, a test sample of the extracted ISF is collected by moving a portion of the ISF from the sample collection chamber to a metering chamber form on the biological fluid monitoring system. From 554, the process 550 proceeds to 556. At 556, a volume of the test sample is determined. From 556, the process 550 proceeds to 558. At 558, the test sample is moved from the metering chamber to a test chamber formed on the biological fluid monitoring system. From 558, the process 550 proceeds to 560. At 560, an electrochemical reaction is conducted on the test sample. From 560, the process 550 proceeds to 562.

At 562, the test sample is moved to a waste chamber formed on the biological fluid monitoring system to complete the test cycle. In some embodiments, each of the formed chambers is coupled to one another via a microfluidic layer. In some embodiments, the biological fluid monitoring system comprises a plurality of electromagnet assemblies each coupled to one of the formed chambers and configured to move the test sample between the coupled to formed chamber and the adjacent formed chamber. In some embodiments, each of the electromagnet assemblies comprises an iron core, a wire, and a permanent magnet. In some embodiments, the iron core and the wire form an electromagnet having an opposite polarity to the permanent magnet. In some embodiments, the electromagnet is configured detach, when charged, from the permanent magnet to allow air into a formed pump source chamber. In some embodiments, each of the electromagnet assemblies is coupled to a respective one of the chambers and a valve formed by a valve block. In some embodiments, the electromagnet is configured to generate, when charged, a negative pressure in the respective chamber and open the valve. In some embodiments, the permanent magnet attracts the electromagnet. In some embodiments, the electromagnet is configured to close, when uncharged, the formed pump source chamber forcing the stored air into the respective liquid chamber and closing the valve. In some embodiments, the respective liquid chamber is configured to drive stored liquid into an adjacent one of the chambers via the microfluidic layer as the stored air is received. In some embodiments, the respective chamber is configured to drive excess liquid into the waste chamber via the microfluidic layer. From 562, the process 550 ends.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Moreover, the separation or integration of various system modules and components in the implementations described earlier should not be understood as requiring such separation or integration in all implementations, and it should be understood that the described components and systems can generally be integrated together in a single product or packaged into multiple products. Accordingly, the earlier description of example embodiments does not define or constrain this disclosure. Other changes, substitutions, and alterations are also possible without departing from the spirit and scope of this disclosure.

Thus, the invention provides, among other things, a biological fluid monitoring system employed to provide a test cycle to ISF collected from a patient. Various features and advantages of the invention are set forth in the following claims.

What is claimed is:

1. A biological fluid monitoring system comprising:
   a microneedle layer;
   at least one electromagnet assembly; and
   at least two liquid chambers coupled via a microfluidic layer, wherein the microneedle layer comprises a plurality of microneedles configured to extract interstitial fluid (ISF) from a patient in to one of the at least two liquid chambers, and wherein the at least one electromagnet assembly is configured to move a test sample of the extracted ISF through the at least two liquid chambers to conduct a test cycle,
   wherein the at least two liquid chambers comprise a metering chamber and a sample collection chamber,
   wherein the microneedles are configured to extract the ISF into the sample collection chamber, and
   wherein the test cycle comprises:
      collecting the test sample of the extracted ISF by moving a portion of the ISF from the sample collection chamber to the metering chamber; and
      determining a volume of the test sample.

2. The biological fluid monitoring system of claim 1, wherein one of the at least two liquid chambers comprises a test chamber, and wherein the test cycle comprises:
   moving the test sample from the metering chamber to the test chamber; and
   conducting an electrochemical reaction on the test sample.

3. The biological fluid monitoring system of claim 2, wherein the at least two chambers comprise a waste chamber, and wherein the test cycle comprises:
   moving the test sample to the waste chamber to complete the test cycle.

4. The biological fluid monitoring system of claim 3, configured to repeat the test cycle to provide continuous monitoring of the patient.

5. A biological fluid monitoring system comprising:
   a microneedle layer:
   at least one electromagnet assembly; and
   at least two liquid chambers coupled via a microfluidic layer, wherein the microneedle layer comprises a plurality of microneedles configured to extract interstitial fluid (ISF) from a patient in to one of the at least two liquid chambers, and wherein the at least one electromagnet assembly is configured to move a test sample of the extracted ISF through the at least two liquid chambers to conduct a test cycle,
   wherein each of the at least one electromagnet assemblies comprise an iron core, a wire, and a permanent magnet;
   wherein the iron core and the wire form an electromagnet having an opposite polarity to the permanent magnet; and
   wherein the electromagnet is configured to detach, when charged, from the permanent magnet to allow air into a formed pump source chamber.

6. The biological fluid monitoring system of claim 5, wherein each of the at least one electromagnet assemblies is coupled to a respective one of the at least two liquid chambers and a valve formed by a valve block; and wherein the electromagnet is configured to generate, when charged, a negative pressure in the respective liquid chamber and open the valve.

7. The biological fluid monitoring system of claim 6, wherein the permanent magnet magnetically attracts the electromagnet; wherein the electromagnet is configured to close, when uncharged, the formed pump source chamber forcing the stored air into the respective liquid chamber and closing the valve; and wherein the respective liquid chamber is configured to drive stored liquid into an adjacent one of the at least two liquid chambers via the microfluidic layer as the stored air is received.

8. The biological fluid monitoring system of claim 7, wherein the respective liquid chamber is configured to drive excess liquid into one of the at least two liquid chambers via the microfluidic layer.

9. A biological fluid monitoring system comprising:
a microneedle layer;
a pneumatic layer and a membrane, wherein the membrane is positioned between the pneumatic layer and the microneedle layer;
at least one electromagnet assembly; and
at least two liquid chambers coupled via a microfluidic layer, wherein the microneedle layer comprises a plurality of microneedles configured to extract interstitial fluid (ISF) from a patient in to one of the at least two liquid chambers, and wherein the at least one electromagnet assembly is configured to move a test sample of the extracted ISF through the at least two liquid chambers to conduct a test cycle.

10. The biological fluid monitoring system of claim 9, wherein the at least two liquid chambers are formed between the pneumatic layer and the microneedle layer.

11. The biological fluid monitoring system of claim 9, configured to be worn by the patient.

12. The biological fluid monitoring system of claim 11, wherein a surface of the microneedle layer is configured to be attached to the patient.

13. A method of conducting a test cycle on interstitial fluid (ISF) collected from a patient, the method comprising:
extracting, via a microneedle layer, the ISF into a sample collection chamber formed on a biological fluid monitoring system comprising the microneedle layer, a pneumatic layer, and a membrane, wherein the membrane is positioned between the pneumatic layer and the microneedle layer;
collecting a test sample of the extracted ISF by moving a portion of the ISF from the sample collection chamber to a metering chamber formed on the biological fluid monitoring system;
determining a volume of the test sample;
moving the test sample from the metering chamber to a test chamber formed on the biological fluid monitoring system;
conducting an electrochemical reaction on the test sample; and
moving the test sample to a waste chamber formed on the biological fluid monitoring system to complete the test cycle.

14. The method of claim 13, wherein each of the formed chambers is coupled to one another via a microfluidic layer.

15. The method of claim 13, wherein the biological fluid monitoring system comprises a plurality of electromagnet assemblies each coupled to one of the formed chambers and configured to move the test sample between the coupled to formed chamber and the adjacent formed chamber.

16. The method of claim 13, wherein the test cycle is repeated to provide continuous monitoring of the patient.

17. The method of claim 13, wherein the microneedle layer comprises a plurality of microneedles configured to extract the ISF from the patient.

18. A biological fluid monitoring system configured to be worn by a patient, the system comprising:
a microneedle layer comprising a plurality of microneedles;
a pneumatic layer;
a membrane, wherein the membrane is positioned between the pneumatic layer and the microneedle layer;
a sample collection chamber, a metering chamber, a test chamber, and a waste chamber each formed between the pneumatic layer and the microneedle layer and coupled to each other via a microfluidic layer, wherein the microneedles are configured to extract interstitial fluid (ISF) from the patient into the sample collection chamber; and
at least one electromagnet assembly coupled to a respective one of the formed chambers and a valve formed by a valve block, the at least one electromagnet assembly comprising an iron core, a wire, and a permanent magnet, wherein the iron core and the wire form an electromagnet having an opposite polarity to the permanent magnet, wherein the electromagnet is configured to, when charged:
detach from the permanent magnet to allow air into a formed pump source chamber, and
generate a negative pressure in the respective coupled to formed chamber to open the valve,
wherein the electromagnet is configured to, when charged:
close the formed pump source chamber forcing the stored air into the respective coupled to formed chamber to close the valve, and
wherein the respective coupled to formed chamber is configured to drive stored liquid into an adjacent one of the formed chambers via the microfluidic layer as the stored air is received.

* * * * *